(12) United States Patent
Ames

(10) Patent No.: US 7,685,718 B2
(45) Date of Patent: Mar. 30, 2010

(54) DEBURR DEVICE

(76) Inventor: William Matthew Ames, 3537 Foxmore La., Rescue, CA (US) 95672

( * ) Notice: Subject to any disclaimer, the term of this patent is extended or adjusted under 35 U.S.C. 154(b) by 169 days.

(21) Appl. No.: 11/703,710

(22) Filed: Feb. 8, 2007

(65) Prior Publication Data

US 2008/0193235 A1    Aug. 14, 2008

(51) Int. Cl.
B26B 1/02 (2006.01)
(52) U.S. Cl. .............................. 30/299; 30/321; 30/314
(58) Field of Classification Search .................. 30/314, 30/299–300, 305, 280, 294, 169
See application file for complete search history.

(56) References Cited

U.S. PATENT DOCUMENTS

| | | | | |
|---|---|---|---|---|
| 735,845 A * | 8/1903 | Vanderbeek | ............... | 279/23.1 |
| 2,759,263 A * | 8/1956 | Shigley et al. | ............... | 30/317 |
| 2,865,100 A * | 12/1958 | Gilbert | .................... | 30/317 |
| 3,327,588 A * | 6/1967 | Yandell | ..................... | 409/296 |
| 3,751,804 A * | 8/1973 | Pulrang | ...................... | 30/169 |
| 3,787,972 A * | 1/1974 | Carossino | .................... | 30/317 |
| 4,777,725 A * | 10/1988 | Hirsch | ........................ | 30/331 |
| 5,054,201 A * | 10/1991 | Andrews | ..................... | 30/172 |
| 5,454,166 A * | 10/1995 | Hirsch | ........................ | 30/317 |
| 5,647,131 A * | 7/1997 | Hirsch | ........................ | 30/317 |
| 7,062,858 B2 * | 6/2006 | Hirsch | ........................ | 30/169 |
| 7,159,319 B2 * | 1/2007 | Huang | ........................ | 30/102 |
| 7,401,408 B1 * | 7/2008 | Buch | ........................... | 30/294 |
| 2003/0177643 A1 * | 9/2003 | Hirsch | ........................ | 30/169 |
| 2005/0132580 A1 * | 6/2005 | Heule | ........................ | 30/317 |

* cited by examiner

Primary Examiner—Kenneth E. Peterson
Assistant Examiner—Sean Michalski

(57) ABSTRACT

A deburr tool for deburring an end of a conduit includes a handle, cutting bit, and head. The handle is to grasp the deburr tool. The handle has a handle axis. The cutting bit includes a distal end, proximal end, body portion and a cutting profile. The body portion is generally cylindrical and has a bit axis. The cutting profile is generally "U" shaped and resides in a plane generally parallel to the bit axis. The cutting profile tapers from an opening disposed at the distal end to an arcuate base. The opening has a distance between a first side and a second side that exceeds a wall thickness of the conduit. The head rotatably secures the cutting bit to the handle. The bit axis coincides with the handle axis.

9 Claims, 7 Drawing Sheets

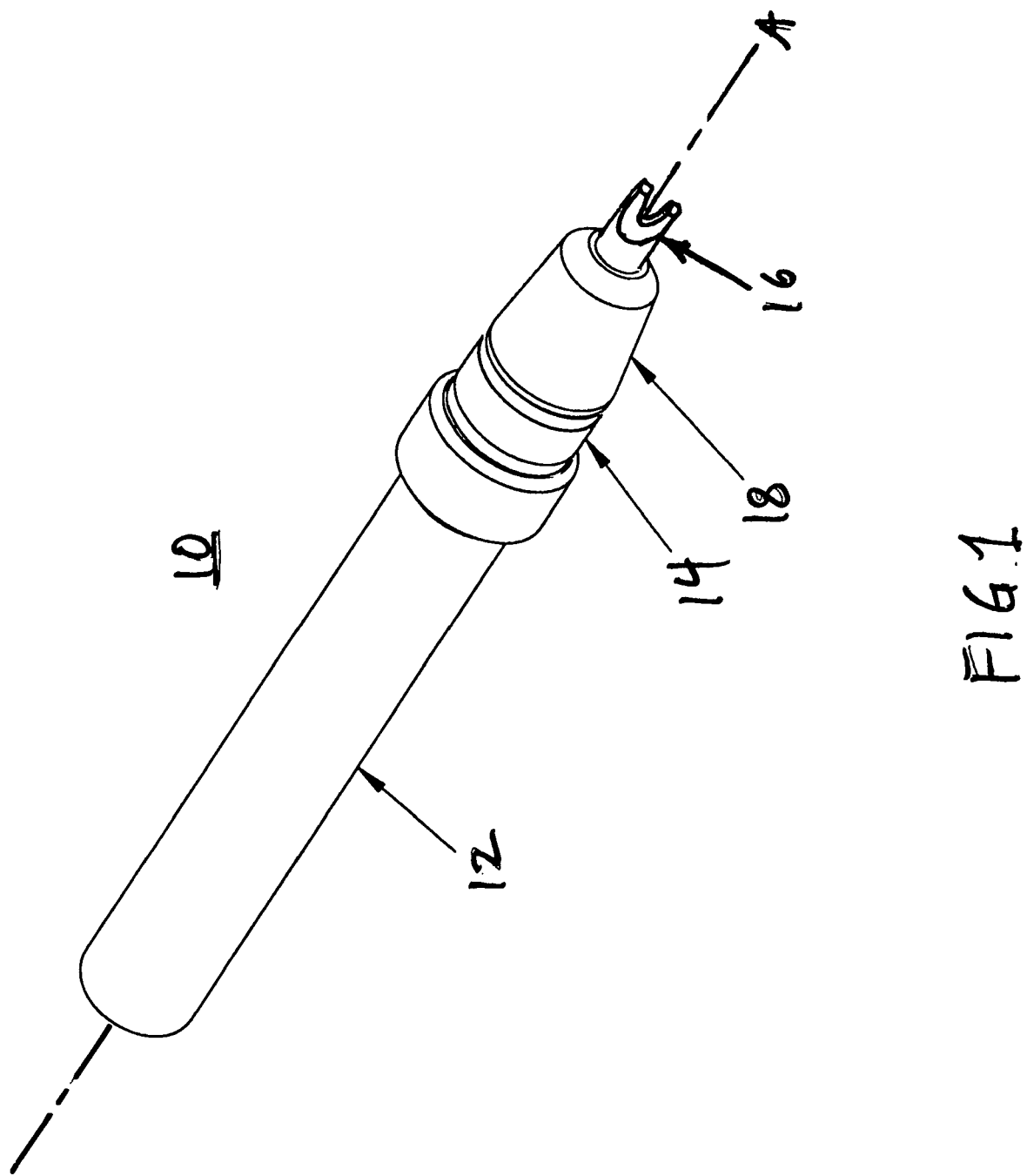

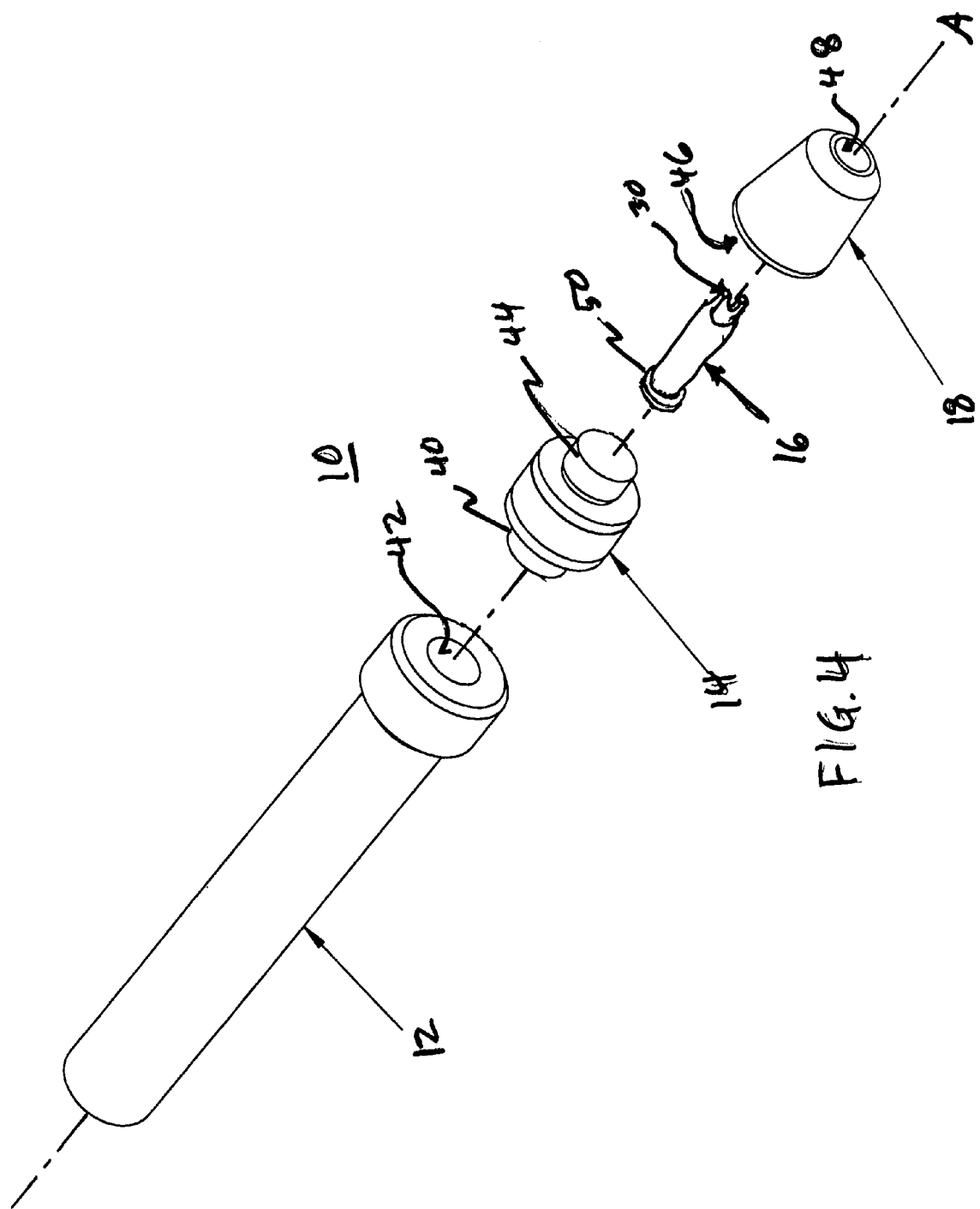

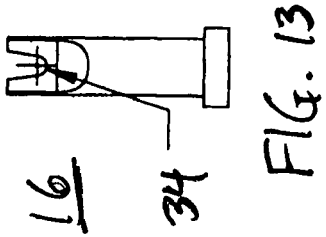
FIG. 13
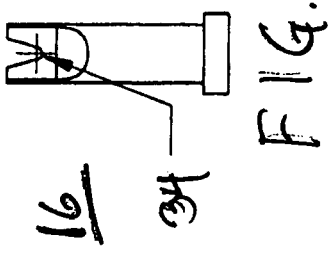
FIG. 12
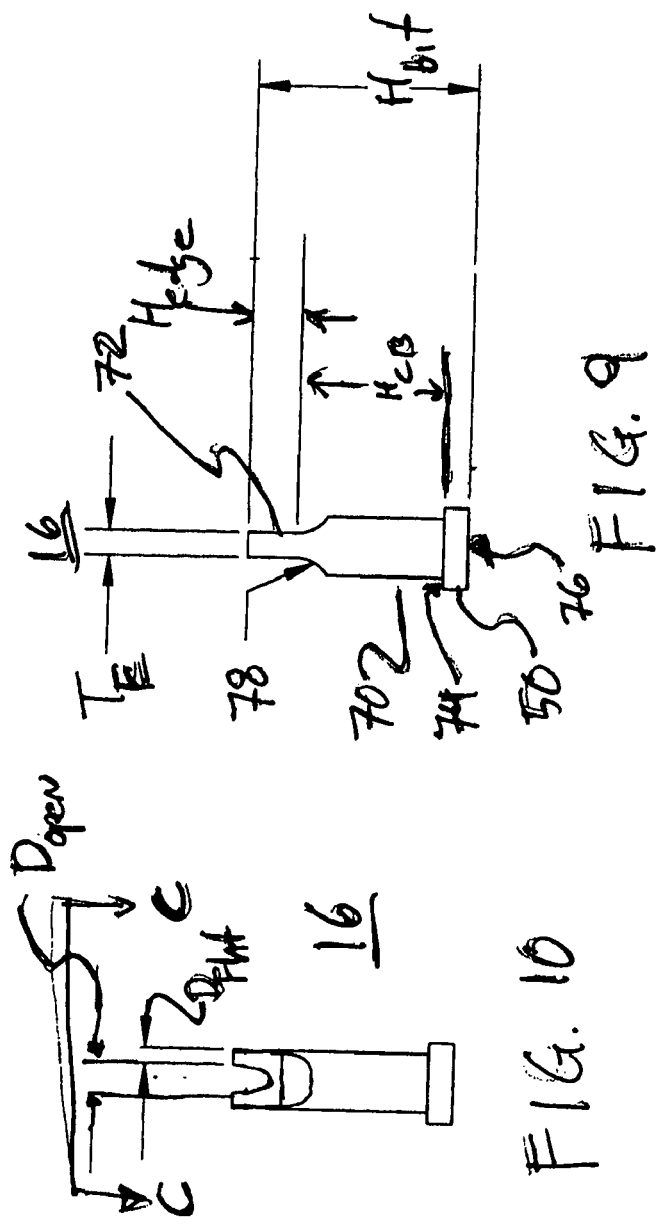
FIG. 9
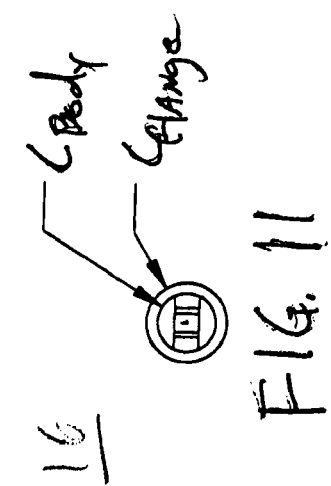
FIG. 11
FIG. 10

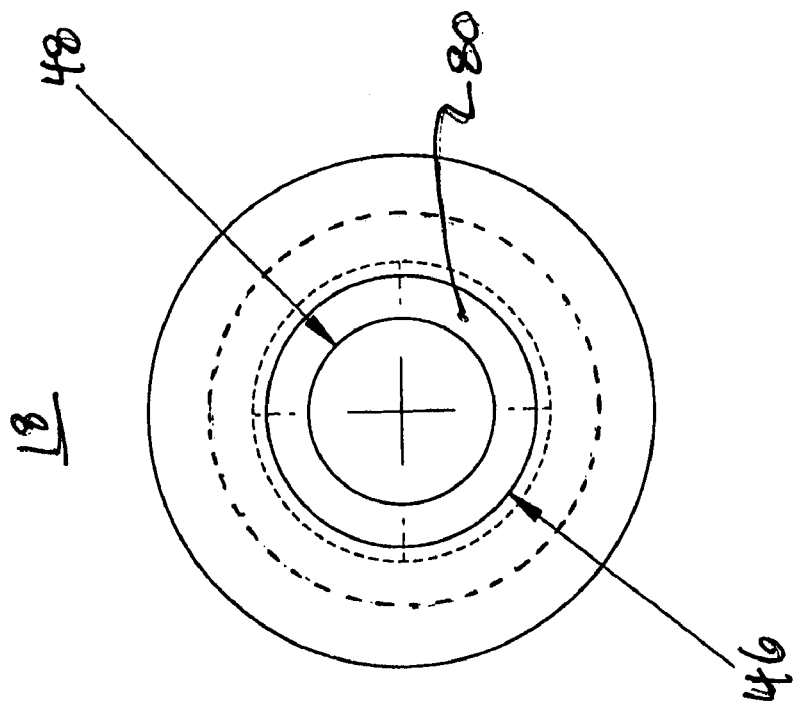
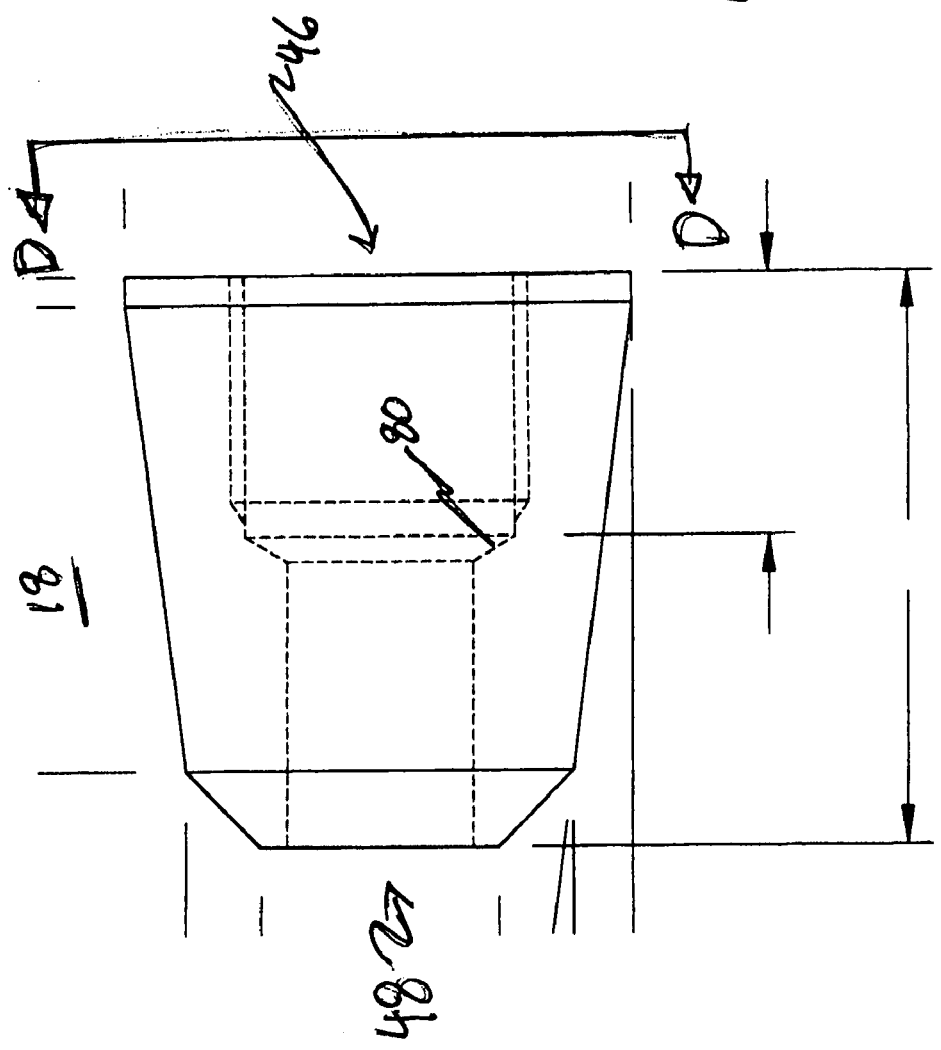

DEBURR DEVICE

FIELD OF THE INVENTION

The present invention generally relates to a surface preparation device and method. More particularly, the present invention pertains to a device and method for removing a burr and/or rough edge from the end of a cut pipe.

BACKGROUND OF THE INVENTION

In various manufacturing and construction industries, pipes or conduit are cut to length from stock. During cutting, a burr or thin edge is raised. Depending on the conduit material and the method of cutting, the burr may be quite sharp and may injure workers or items that brush against the burr. For example, insulated wires are typically pulled through conduit after the conduit is installed. Any burrs that remain at the ends of the conduit may damage the insulation. Accordingly, the cut pieces of conduit are finished in preparation for assembly. Finishing steps generally include removing the burr and may also include shaping the profile of the cut end. For example, to ease assembly of conduit and connecting joints, the profile of the cut end may be rounded or tapered to facilitate assembly.

For relatively small conduit with an inside diameter of ¼ inch to about 1 inch, conventional deburring tools are readily available. These conventional deburring tools generally include a portion with an outside diameter that is approximately the same size as the inside diameter of the conduit to deburr. A cutter extends out one side of the conventional deburring tool. The conduit is deburred by inserting the tool into the open cut end of the conduit until the cutter contacts the cut edge and the tool is twisted one or more full rotations until the edge is properly formed.

Unfortunately, the tool must be sized for the conduit being cut and will not work for conduit that is over or undersized. In addition, conventional deburring tools for large conduit and pipes are large, heavy, expensive and difficult to use. For larger conduit having an inside diameter of about 2 inches to greater than 6 inches, the industry standard deburring tool is a half-round file. Hand filing a smooth profile in large conduit is labor intensive, extremely time consuming, and potentially physically hazardous.

Accordingly, it is desirable to provide a method and apparatus capable of overcoming the disadvantages described herein at least to some extent.

SUMMARY OF THE INVENTION

The foregoing needs are met, to a great extent, by the present invention, wherein in one respect a deburr device and method of deburring essentially any sized conduit is provided.

An embodiment of the present invention pertains to a deburr tool for deburring an end of a conduit. The deburr tool includes a handle, cutting bit, and head. The handle is to grasp the deburr tool. The handle has a handle axis. The cutting bit includes a distal end, proximal end, body portion and a cutting profile. The body portion is generally cylindrical and has a bit axis. The cutting profile is generally "U" shaped and resides in a plane generally parallel to the bit axis. The cutting profile tapers from an opening disposed at the distal end to an arcuate base. The opening has a distance between a first side and a second side that exceeds a wall thickness of the conduit. The head rotatably secures the cutting bit to the handle. The bit axis coincides with the handle axis.

Another embodiment of the present invention relates to an apparatus for simultaneously reaming an inside and outside edge of an end of a conduit. The apparatus includes a shaft, cutting bit, and collet. The cutting bit has a cutting profile residing in a plane generally parallel to a central axis of the cutting bit. The cutting profile includes a continuous cutting edge extending from a first side of an opening to an arcuate base and terminating at a second side of the opening. The collet detachably secures the cutting bit to the shaft. A central axis of the shaft is aligned with the central axis of the cutting bit. The inside and outside edges of the end of the conduit are simultaneously reamed in response to introducing the continuous cutting edge to the end of the conduit and drawing the apparatus along a perimeter of the end of the conduit with the central axis of the cutting bit being generally parallel to a central axis of the conduit.

Yet another embodiment of the present invention pertains to a method of deburring a conduit. In this method a generally "U" shaped cutting profile is aligned to straddle the conduit at a point along a perimeter of an end of the conduit. The cutting profile resides in a plane that passes through a center point in a circle defined by the end of the conduit. The cutting profile is urged towards the end of the conduit with a handle having a central axis parallel to the plane of the cutting profile. The cutting profile is urged to circumnavigate the perimeter of the end of the conduit with the handle.

Yet another embodiment of the present invention pertains to a method of simultaneously reaming an inside and outside edge of an end of a conduit. In this method, a center point of a cutting profile is generally aligned with a point along a perimeter of the end of the conduit. The cutting profile resides in a plane and includes a continuous cutting edge extending from a first side of an opening to an arcuate base and terminating at a second side of the opening. The plane of the cutting profile is generally aligned perpendicularly to a line tangent to the point along the perimeter of the end of the conduit. The cutting profile is urged towards the end of the conduit with a handle having a central axis parallel to the plane of the cutting profile. The cutting profile is urged to circumnavigate the perimeter of the end of the conduit with the handle.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a perspective view of a deburr tool according to an embodiment of the invention.

FIG. 4 is an exploded view of the deburr tool of FIG. 1.

FIG. 9 is a side view of a cutting bit suitable for use with the device according to FIG. 1.

FIG. 10 is a front view of a cutting bit suitable for use with the device according to FIG. 1.

FIG. 11 is an end view C-C of the cutting bit according to FIG. 10.

FIG. 12 is a side view of a cutting bit suitable for use with the device according to FIG. 1.

FIG. 13 is a side view of another cutting bit suitable for use with the device according to FIG. 1.

FIG. 14 is a hidden line view of a head suitable for use with the deburr tool according to FIG. 1.

FIG. 15 is an end view D-D of the head according to FIG. 14.

DETAILED DESCRIPTION

Figure 3:
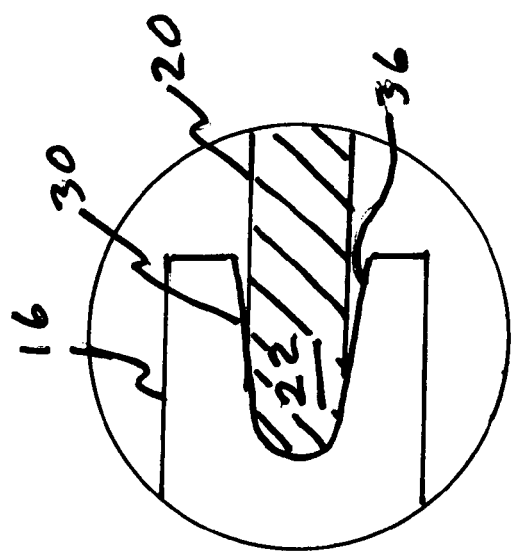
FIG. 3 is a detailed view of inset A following a deburring procedure.

The present invention provides a deburr tool for deburring an end of a conduit. Preferred embodiments of the invention will now be described with reference to the drawing figures, in which like reference numerals refer to like parts throughout. As shown in FIG. 1, a deburr tool 10 includes a handle 12, couple 14, cutting bit 16, and head 18. In addition, according to an embodiment the handle 12, couple 14, cutting bit 16, and head 18 are aligned along an axis A.

Figure 2:
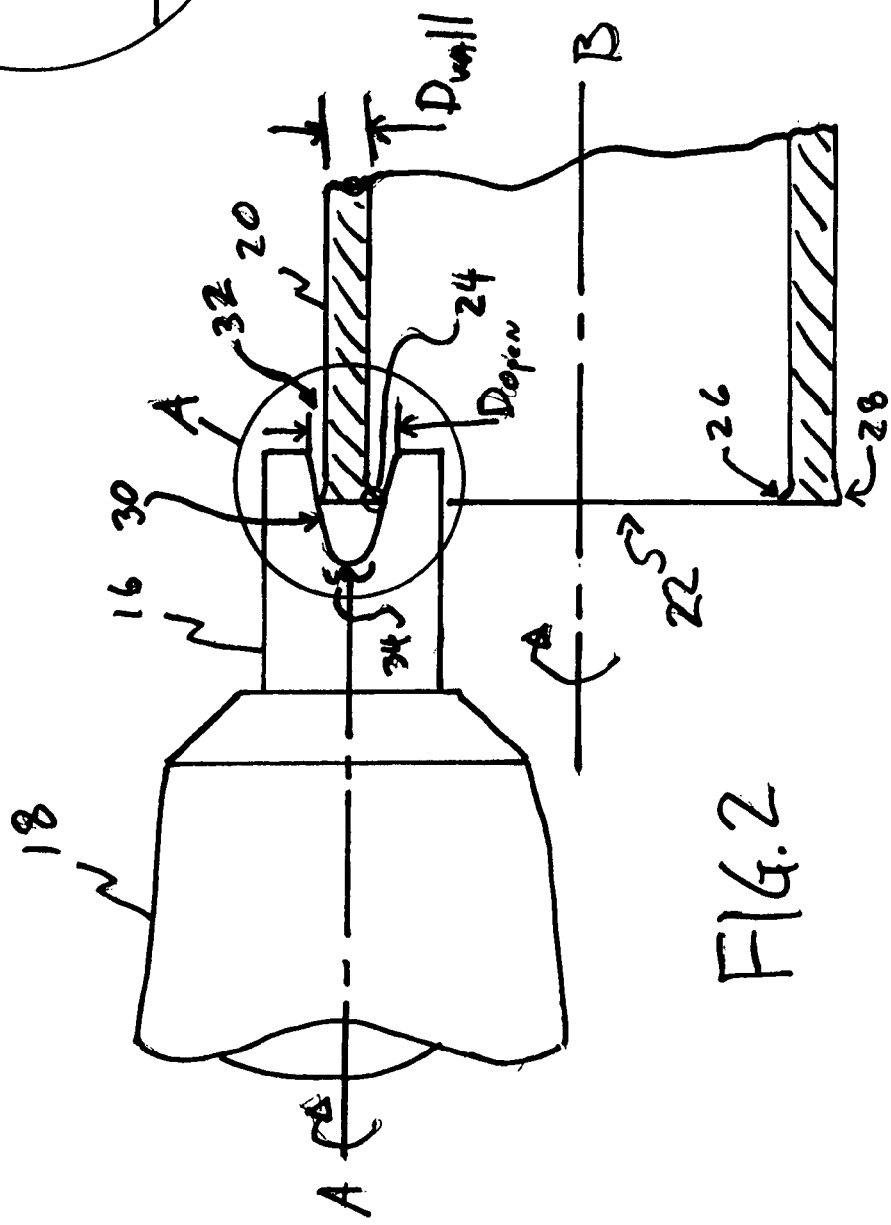
FIG. 2 is a partial cutaway view of the deburr tool according to FIG. 1 performing a deburring procedure on a conduit.

The handle 12 is to grasp the deburr tool 10. In various embodiments, the handle 12 may be textured and/or anatomically shaped to conform to a user's hand. As shown in FIG. 2, the handle 12 is grasped by the user, the deburr tool 10 is aligned with a conduit and an end or rim of the conduit is engaged with the cutting bit 16. The deburr tool 10 is then urged around the conduit to deburr the end.

FIG. 2 is a partial cutaway view of the deburr tool 10 according to FIG. 1 performing a deburring procedure on a conduit 20. As shown in FIG. 2, the conduit 20 includes an end 22, burr 24, inside edge 26, outside edge 28, and an axis B. The burr 24 may be generated during a cutting procedure to cut a stock length of the conduit 20 to an appropriate size. Depending upon the method of cutting, the burr 24 may be formed along the inside edge 26 and/or outside edge 28. It is an advantage of embodiments of the deburr tool 10 that both the inside edge 26 and outside edge 28 may be deburred or reamed essentially simultaneously.

Also shown in FIG. 2, the cutting bit 16 includes a cutting profile 30 that is generally "U" shaped or a tapered "U" shape. The cutting profile 30 tapers from an opening 32 to a base 34 that is generally arcuate or tapered. Stated in another manner, the cutting profile 30 includes a continuous cutting edge 36 extending from a first side of opening 32 to the base 34 and terminating at a second side of the opening. In a particular example, the base 34 is radiused The opening 32 has a distance ("$D_{open}$") between a first side and a second side that exceeds a wall thickness ("$D_{wall}$") of the conduit 20. In a particular example, the $D_{open}$ may be about 0.15 inches.

To remove the burr 24 and/or otherwise finish or ream the end 22, the deburr tool 10 is aligned with the conduit 20 and the opening 32 is introduced to the end 22 such that the inside edge 26 and outside edge 28 are inserted into the opening 32. As shown in FIG. 2, the axis A and axis B are essentially parallel as the deburring or reaming procedure is initiated.

FIG. 3 is a detailed view of inset A following a deburring procedure. As shown in FIG. 3, following one or more circumnavigation of the end 22, the end 22 has been made to generally conform to the cutting profile 30. That is, the inside edge 26 and outside edge 28 have been simultaneously reamed in response to introducing the continuous cutting edge 36 to the end 22 and drawing the deburr tool 10 along a perimeter of the end 22 with the axis A of the cutting bit 16 being generally parallel to axis B of the conduit 20.

FIG. 4 is an exploded view of the deburr tool 10 of FIG. 1. As shown in FIG. 4, the axis A coincides with a central axis for the various components of the deburr tool 10 including the handle 12, couple 14, cutting bit 16, and head 18. Also shown in FIG. 4, the couple 14 includes a threaded portion 40 configured to mate with a tapped bore 42 in the handle 12. The couple 14 also includes a threaded portion 44 configured to mate with a tapped bore 46 in the head 18. In this manner, the couple 14 is configured to couple the various components of the deburr tool 10. The head 18 includes a bore 48 sized to accept at least a portion of the cutting bit to pass therethrough. In this manner, the cutting profile 30 may extend out from the head 18. The bore 48 is formed along the axis A and thus aligns the bit 16 along the axis A.

To retain the cutting bit 16 in the deburr tool 10 and essentially prevent the cutting bit 16 from passing fully out of the head 18 during use, the cutting bit 16 includes a flange 50. The flange 50 is sized or otherwise configured to stop the cutting bit 16 from further progress through the bore 48 The head 18 or collet detachably secures the cutting bit 16 to the couple 14 and, via the couple 14, to the handle 12 or shaft.

Figure 5:
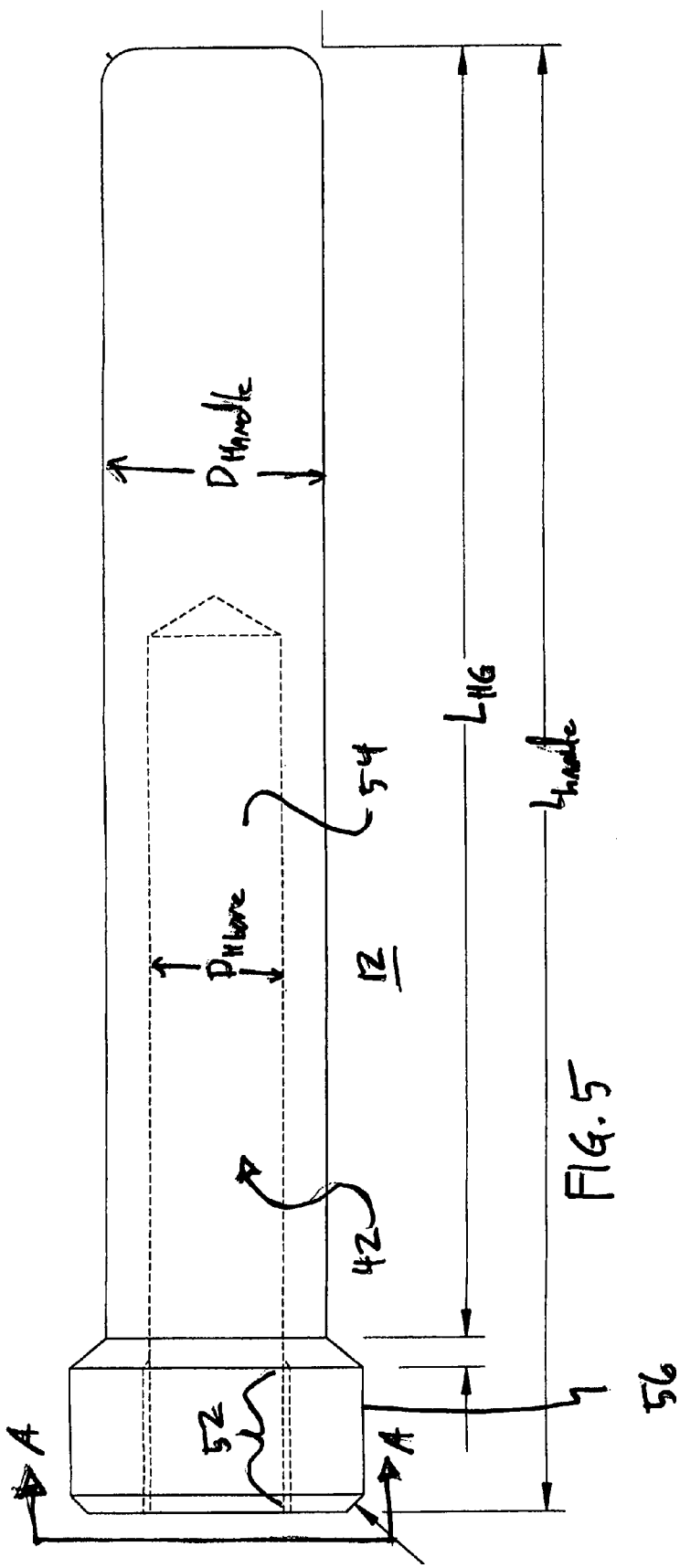
FIG. 5 is a hidden line view of a handle suitable for use with the deburr tool according to FIG. 1.

FIG. 5 is a hidden line view of the handle 12 suitable for use with the deburr tool 10 according to FIG. 1. As shown in FIG. 5, the handle 12 includes the tapped bore 42. The tapped bore 42 may include a tapped portion 52 configured to mate with the threaded portion of the couple 14 as shown in FIG. 4. In addition, the tapped bore may include a storage compartment 54 to store a cutting bit 16 e.g., a spare or different bit. In this regard, the tapped bore 42 may include a diameter ("$D_{hbore}$") sized to accept the cutting bit 16. In a particular example, the $D_{hbore}$ may be about 0.5 inches. In addition, the handle 12 may include a diameter ("$D_{handle}$") configured to fit a hand of the user. In a particular example, the $D_{handle}$ may be about 0.75 inches.

The handle 12 may further include a thickened section or hilt 56 to reduce slippage of the user's hand from the handle 12. In this regard, the handle 12 or a portion thereof may be textured to provide a gripping surface for the user. In a particular example, a length of the handle 12 gripping surface ("$L_{hg}$") may be about 4 inches to about 5 inches. The overall length of the handle ("$L_{handle}$") may be about 4 inches to about 6 inches.

The handle 12 may be generated in any suitable manner from any suitable material or materials. Suitable methods of production include any of the myriad forms of casting, machining, assembly, and/or the like. Suitable materials include metals, polymers, rubbers, natural materials, and the like. In a particular example, the handle 12 is milled from a cast block of 6061 aluminum alloy with a T6 temper.

Figure 6:
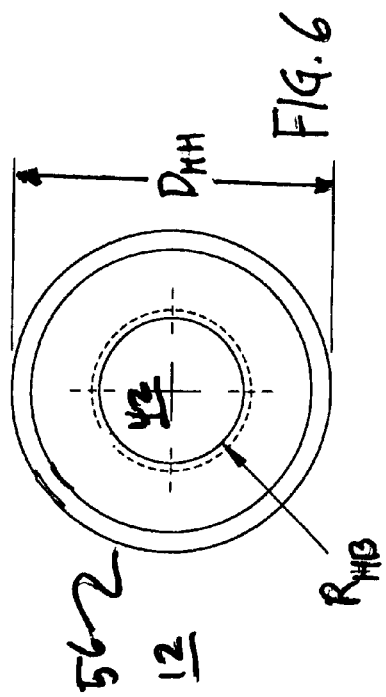
FIG. 6 is an end view A-A of the handle according to FIG. 5.

FIG. 6 is an end view A-A of the handle 12 according to FIG. 5. As shown in FIG. 6, the hilt 56 may be approximately circular with a diameter ("$D_{hh}$") of about 1 inch. The tapped bore 42 is generally centered within the handle 12 and includes a radius ("$R_{hb}$") of about 0.25 inches.

Figure 7:
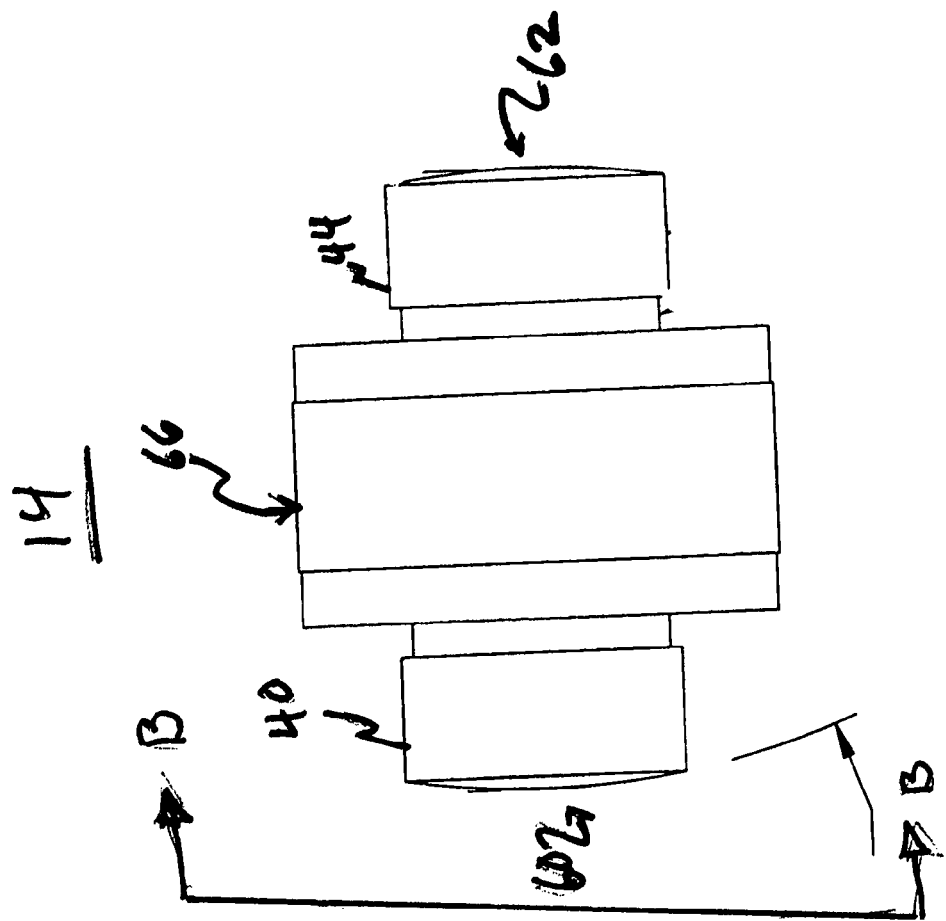
FIG. 7 is a side view of a couple suitable for use with the deburr tool according to FIG. 1.

FIG. 7 is a side view of the couple 14 suitable for use with the deburr tool 10 according to FIG. 1. As shown in FIG. 7, the couple 14 includes the threaded portions 40 and 44 and a respective spherical base 60 and 62. The spherical bases 60 and 62 are disposed at the ends of each of the threaded portions 40 and 44 to provide a bearing surface for the cutting bit 16. In this regard, the couple may be generally symmetrical such that either the threaded portion 40 or 44 may be threadedly engaged with the tapped bore 42 or the tapped bore 46. When assembled, the spherical base 60 or 62 is aligned with and configured to support a base of the cutting bit 16. The spherical base 60 and 62 facilitate rotation of the cutting bit 16 relative to the head 18 by reducing a contact area between the spherical base 60 and 62 and the base of the cutting bit relative to a flat surface. That is, if both the base of the cutting bit 16 and the spherical base 60 or 62 were flat, the friction between these surfaces might retard rotation of the cutting bit 16.

The couple 14 may include a gripping ring 66 to facilitate gripping the couple 14. The gripping ring 66 provides a gripping surface to facilitate assembly and disassembly of the deburr tool 10. To facilitate gripping, the gripping surface may be textured such as, for example, diamond knurled or the like. In various embodiments, the couple 14 may be generated in any suitable manner and from any suitable material or materials. In a particular example, the couple 14 is machined from a piece of steel such as 1018 CRS cold rolled steel.

Figure 8:
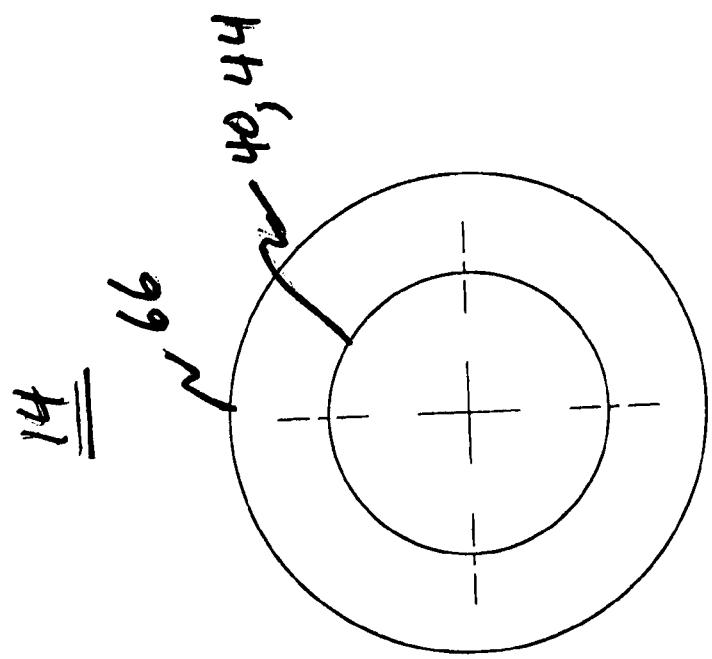
FIG. 8 is an end view B-B of the couple according to FIG. 7.

FIG. 8 is an end view B-B of the couple 14 according to FIG. 7. As shown in FIG. 8 the threaded portions 40 and 44 are generally centered within the couple 14. The gripping ring and threaded portions 40 and 44 are generally circular or cylindrical in shape. In a particular example, the threaded portions 40 and 44 have a diameter of about 0.5 inches and the gripping ring has a diameter of about 0.85 inches.

FIGS. 9-13 provide a variety of views of cutting bits 16 suitable for use with the deburr tool 10. FIG. 9 is a side view of the cutting bit 16 suitable for use with the deburr tool 10 according to FIG. 1. As shown in FIG. 9, the cutting bit 16 includes the flange 50, a body portion 70 and an edge portion 72. The flange 50 includes a flange face 74 and base 76. The flange face 74 provides a stop to retain the cutting bit 16 in the head 18. The base 76 provides a surface for the spherical base 60 or 62 to bear upon.

The body portion 70 is configured to fit within the bore 48. In an embodiment, the body portion 70 is sized to rotate securely within the bore 48. To transition from the body portion 70 to the edge portion 72, the cutting bit 16 may include a transition such as, for example, an incut 78. In a particular example, the incut 78 includes a radius of about 0.375 inches. The body portion 70 is sized such that the edge portion 72 extends from the head 18. In a particular example, the body portion 70 includes a height ("$H_{cb}$") of about 0.88 inches.

The edge portion 72 as seen in profile in the side view of FIG. 9 is defined by a plane or face parallel to a central axis of the cutting bit 16. As such, when assembled, the face of the edge portion is parallel to the axis A as show in FIGS. 1 and 2. The edge portion further includes an edge thickness ("$T_e$"). In a particular example, the $T_e$ is about 0.125 inches. In various embodiments, the cutting bit 16 or edge portion 72 may be generated in any suitable manner from any suitable material or materials. Suitable materials include metals, carbine, ceramics, or the like. In a particular example, at least the edge portion 72 is machined from cryo tempered A2 tool steel.

FIG. 10 is a front view of the cutting bit 16 suitable for use with the deburr tool 10 according to FIG. 1. As shown in FIG. 10, the cutting bit 16 may include a relatively flat portion or tip 80. In a particular example, the tip may be about 0.075 inches wide.

FIG. 11 is an end view C-C of the cutting bit according to FIG. 10. As shown in FIG. 11, the cutting bit 16 is generally cylindrical. More particularly, the body portion 70 is generally cylindrical and the flange 50 is generally cylindrical. In a specific example, the body portion 70 includes a circumference ("$C_{body}$") of about 0.3 inches and the flange 50 includes a circumference ("$C_{flange}$") of about 0.41 inches.

FIG. 12 is a side view of the cutting bit 16 suitable for use with the deburr tool 10 according to FIG. 1. As show in FIG. 12, the base 34 of the cutting profile 30 has a radius of about 0.030 inches.

FIG. 13 is a side view of another cutting bit 16 suitable for use with the deburr tool 10 according to FIG. 1. As show in FIG. 13, the base 34 of the cutting profile 30 has a radius of about 0.050 inches.

FIG. 14 is a hidden line view of the head 18 suitable for use with the deburr tool 10 according to FIG. 1. The head 18 rotatably secures the cutting bit 16 to the handle 12. As described herein, the head includes the bore 48 to secure the cutting bit 16. The bore 48 is sized to secure the body portion 70 while allowing free rotation of the cutting bit 16 about the axis A. In a particular example, the bore 48 includes a diameter of slightly greater than 0.3 inches. The bore 48 further includes a bore length ("$B_l$") of about 0.51 inches. The head 18 further includes a flange retaining land 80 to retain the flange 50. In this manner, when assembled, the head 18 essentially captures the cutting bit 16 and rotatably secures the cutting bit 16 to the couple 14 and, via the couple 14, to the handle 12.

FIG. 15 is an end view D-D of the head 18 according to FIG. 14. As shown in FIG. 15, the bore 48 is generally centered with respect to the head 18. Similarly, the tapped bore 46 is generally centered with respect to the head 18. The flange retaining land 80 provides a concentric ring to transitions between the bore 48 and the tapped bore 46.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A deburr tool for deburring an end of a conduit comprising:
   a handle to grasp the deburr tool, the handle having a central handle axis;
   a cutting bit having a distal end, proximal end, body portion and a pair of cutting profiles, the body portion being generally cylindrical and having a bit axis, each cutting profile of the pair of cutting profiles being generally "U" shaped and residing in a respective cutting profile plane generally parallel to the bit axis, the cutting profile planes being parallel to one another and the central handle axis being centered between the cutting profile planes, wherein each cutting profile tapers from an opening disposed at the distal end to an arcuate base and the cutting profiles being symmetrical about the central handle axis, the opening having a distance between a first side and a second side that exceeds a wall thickness of the conduit; and a head to rotatably secure the cutting bit to the handle, wherein the bit axis coincides with the central handle axis;

a flange disposed at the proximal end of the cutting bit;

a head bore passing through a central axis of the head, the head bore having a diameter sized to accept the body portion of the cutting bit and the head bore having a length configured to facilitate extending the cutting profile from a distal end of the head; and a flange retaining surface disposed at a proximal end of the head bore, wherein the flange retaining surface mates with the flange to retain the cutting bit in the head.

2. The deburr tool according to claim 1, further comprising:
a couple to secure the head to the handle.

3. The deburr tool according to claim 2, further comprising:
a threaded cylindrical portion extending from the couple to mate with a tapped base portion of the head.

4. The deburr tool according to claim 3, further comprising:
a spherical base disposed at a distal end of the threaded cylindrical portion, the spherical base providing a bearing surface for the proximal end of the cutting bit, wherein the spherical base facilitates rotation of the cutting bit relative to the head by reducing a contact area between the spherical base and the proximal end of the cutting bit relative to a flat surface.

5. The deburr tool according to claim 1, further comprising:
a bore passing through a portion of the handle along the handle axis to retain a second cutting bit.

6. The deburr tool according to claim 1, wherein the openings of the cutting profiles are about 0.150 inches wide.

7. The deburr tool according to claim 1, wherein the arcuate bases of the cutting profiles has a radius of about 0.030 inches.

8. The deburr tool according to claim 1, wherein the arcuate bases of the cutting profiles has a radius of about 0.050 inches.

9. A deburr tool for deburring an end of a conduit comprising:

a handle to grasp the deburr tool, the handle having a central handle axis;

a cutting bit having a distal end, proximal end, body portion and a pair of cutting profiles, the body portion being generally cylindrical and having a bit axis, each cutting profile of the pair of cutting profiles being generally "U" shaped and residing in a respective cutting profile plane generally parallel to the bit axis, the cutting profile planes being parallel to one another and the central handle axis being centered between the cutting profile planes, the cutting profiles being symmetrical about the central handle axis, wherein each cutting profile tapers from an opening disposed at the distal end to an arcuate base and the opening having a distance between a first side and a second side that exceeds a wall thickness of the conduit, wherein an active cutting profile of the pair of cutting profiles is configured to precede the central handle axis as the active cutting profile is urged about a circumference of the end of the conduit and a passive cutting profile of the pair of cutting profiles is configured to trail the central handle axis; and a head to rotatably secure the cutting bit to the handle, wherein the bit axis coincides with the central handle axis.

* * * * *